(12) United States Patent
Fujio

(10) Patent No.: US 8,497,889 B2
(45) Date of Patent: Jul. 30, 2013

(54) DISPLAY APPARATUS

(75) Inventor: Shigenori Fujio, Saitama (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 1276 days.

(21) Appl. No.: 11/854,023

(22) Filed: Sep. 12, 2007

(65) Prior Publication Data

US 2008/0063306 A1 Mar. 13, 2008

(30) Foreign Application Priority Data

Sep. 13, 2006 (JP) ................................. 2006-247817

(51) Int. Cl.
*G09G 5/10* (2006.01)
(52) U.S. Cl.
USPC ........................................................ 345/698
(58) Field of Classification Search
USPC .......................................... 345/698; 382/298
See application file for complete search history.

(56) References Cited

U.S. PATENT DOCUMENTS

| | | | | |
|---|---|---|---|---|
| 5,311,316 A | * | 5/1994 | Sato | 348/584 |
| 5,504,931 A | * | 4/1996 | Furtek | 712/17 |
| 5,969,706 A | * | 10/1999 | Tanimoto et al. | 345/671 |
| 6,366,263 B1 | * | 4/2002 | Takasu et al. | 345/13 |
| 6,954,282 B2 | * | 10/2005 | Miyamoto et al. | 358/1.18 |
| 7,764,318 B2 | | 7/2010 | Okamoto et al. | |
| 7,839,436 B2 | | 11/2010 | Hamamura | |
| 7,864,220 B2 | | 1/2011 | Kanzaki | |
| 7,889,246 B2 | | 2/2011 | Fujio et al. | |
| 2001/0048447 A1 | * | 12/2001 | Jogo | 345/620 |
| 2002/0191866 A1 | * | 12/2002 | Tanabe | 382/298 |
| 2003/0067986 A1 | * | 4/2003 | Yoon et al. | 375/240.16 |
| 2004/0017394 A1 | * | 1/2004 | Adachi | 345/744 |
| 2007/0171293 A1 | | 7/2007 | Okamoto | |
| 2008/0062276 A1 | | 3/2008 | Hirai et al. | |
| 2008/0062277 A1 | | 3/2008 | Hirai et al. | |

FOREIGN PATENT DOCUMENTS

| | | |
|---|---|---|
| JP | 6-067803 | 3/1994 |
| JP | 10-243353 | 9/1998 |
| JP | 2002-183207 | 6/2002 |
| JP | 2005-286550 | 10/2005 |
| JP | 2006 202106 | 8/2006 |

OTHER PUBLICATIONS

English language Abstract of JP 2006-202106.
U.S. Appl. No. 11/853,863 to Hirai et al, filed Sep. 12, 2007.
U.S. Appl. No. 11/853,935 to Fujio et al, filed Sep. 12, 2007.
U.S. Appl. No. 11/853,984 to Hamamura, filed Sep. 12, 2007.
U.S. Appl. No. 11/853,878 to Hirai et al., filed Sep. 12, 2007.
U.S. Appl. No. 11/853,902 to Okamoto et al., filed Sep. 12, 2007.
U.S. Appl. No. 11/853,918 to Kanzaki, filed Sep. 12, 2007.
Japan Office action, dated May 10, 2011 along with an english translation thereof.

* cited by examiner

*Primary Examiner* — Quan-Zhen Wang
*Assistant Examiner* — Nelson D Runkle, III
(74) *Attorney, Agent, or Firm* — Greenblum & Bernstein, P.L.C.

(57) ABSTRACT

A display apparatus comprises a display unit and a controller. The display unit displays a first image and a second image. The controller controls the display unit. When the second image is displayed after an enlargement of a part of the first image is performed, the controller specifies a first position relationship between the first enlargement and the first image, and performs the enlargement of the second image on the basis of the first positional relationship.

9 Claims, 4 Drawing Sheets

DISPLAY APPARATUS

BACKGROUND OF THE INVENTION

1. Field of the Invention

The present invention relates to an indicating or display apparatus and in particular to an apparatus such that an enlargement indication can be performed.

2. Description of the Related Art

An indicating or display apparatus that performs the total indication of the captured image and performs the enlargement indication of the part of the captured image, such as Japanese unexamined patent publication (KOKAI) No. 2006-202106, is proposed.

However, when another image (for example the next image or the previous image) is indicated after the enlargement indication of the image, the enlargement indication is cancelled so that the other image is indicated with the total indication, or a position for the enlargement indication is changed so that the enlargement indication of the center of the other image etc. is performed.

Therefore, for performing the enlargement indication of the same position of the image, it is necessary to re-set the enlargement indication area by operating the direction keys etc., so that the operation becomes complicated.

SUMMARY OF THE INVENTION

Therefore, an object of the present invention is to provide an indicating apparatus such that the enlargement indication of a plurality of images can be performed without complicating operation.

According to the present invention, an indicating apparatus comprises a display unit and a controller. The display unit indicates a first image and a second image. The controller controls the display unit. When the second image is indicated after an enlargement indication of a part of the first image as a first enlargement indication area is performed, the controller specifies a first position relationship between the first enlargement indication area and the first image, and performs the enlargement indication of the second image on the basis of the first position relationship. The controller specifies the first position relationship by obtaining a second position relationship between a base point in the first enlargement indication area and a range of movement of the base point in the first image.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
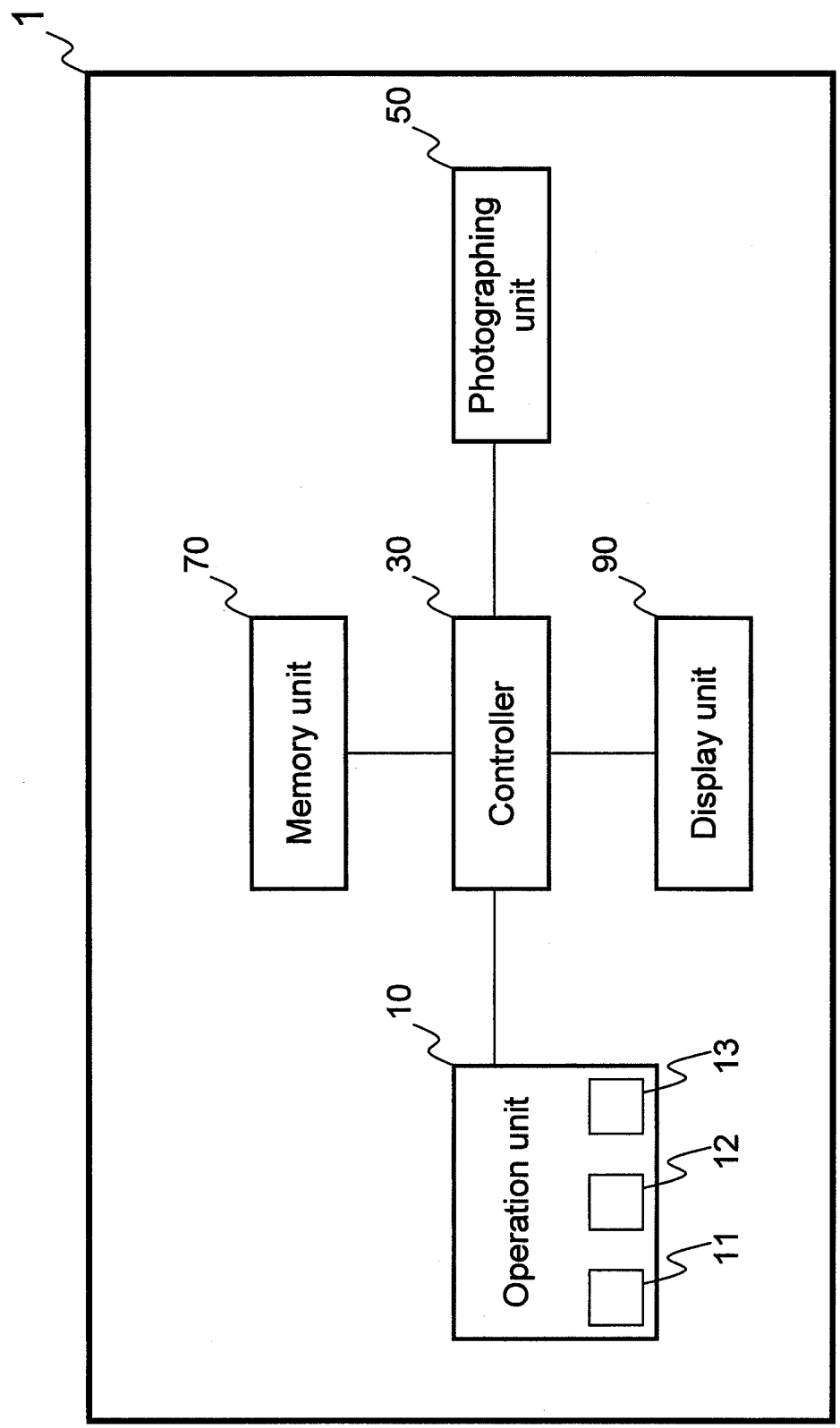
FIG. 1 is a construction figure of the photographing apparatus in the embodiment.

The present invention is described below with reference to the embodiment shown in the drawings. In this embodiment, the photographing apparatus 1 is a digital camera.

In the embodiment, it is explained by using the digital camera that indicates or displays the captured image. However, another apparatus (an indicating apparatus) that has a controller and a display unit may be used.

The imaging part of the photographing apparatus 1 comprises an operation unit 10, a controller 30, a photographing unit 50, a memory unit 70, and a display unit 90 (see FIG. 1).

The operation unit 10 has an enlargement and reduction key 11, direction keys 12, and a page change key 13.

The enlargement and reduction key 11 is a dial etc., and is used for enlarging and reducing the playback image on the display unit 90.

The direction keys 12 have four direction keys such as an up key, a down key, a right key, and a left key, and are used for specifying an area to enlarge.

The page change key 13 is used for switching the image that is indicated on the display unit 90 with the previous or next image.

When one of the direction keys 12 is operated, an enlargement indication frame is displayed on the image that is indicated or displayed on the display unit 90. The enlargement indication frame is moved corresponding to the operation of the direction keys 12.

The enlargement indication frame is an area for specifying a first enlargement indication area LP1 and a second enlargement indication area LP2. A base point PP is arranged in a predetermined position inside the enlargement indication frame. Specifically, in the embodiment, the base point PP is arranged in the top left corner portion of the enlargement indication frame.

In a photographing operation, the photographic subject image is captured as an optical image through a lens (not depicted) by the imaging sensor of the photographing unit 50 so that the image obtained by the photographing operation is displayed on the display unit 90 and the image data obtained by the photographing operation is stored in the memory unit 70.

In the embodiment, the memory unit 70 stores a first image data and a second image data. The display unit 90 plays back (indicates) in order, a first image FP1 corresponding to the first image data and a second image FP2 corresponding to the second image data. The display unit 90 is controlled by the controller 30.

Figure 2:
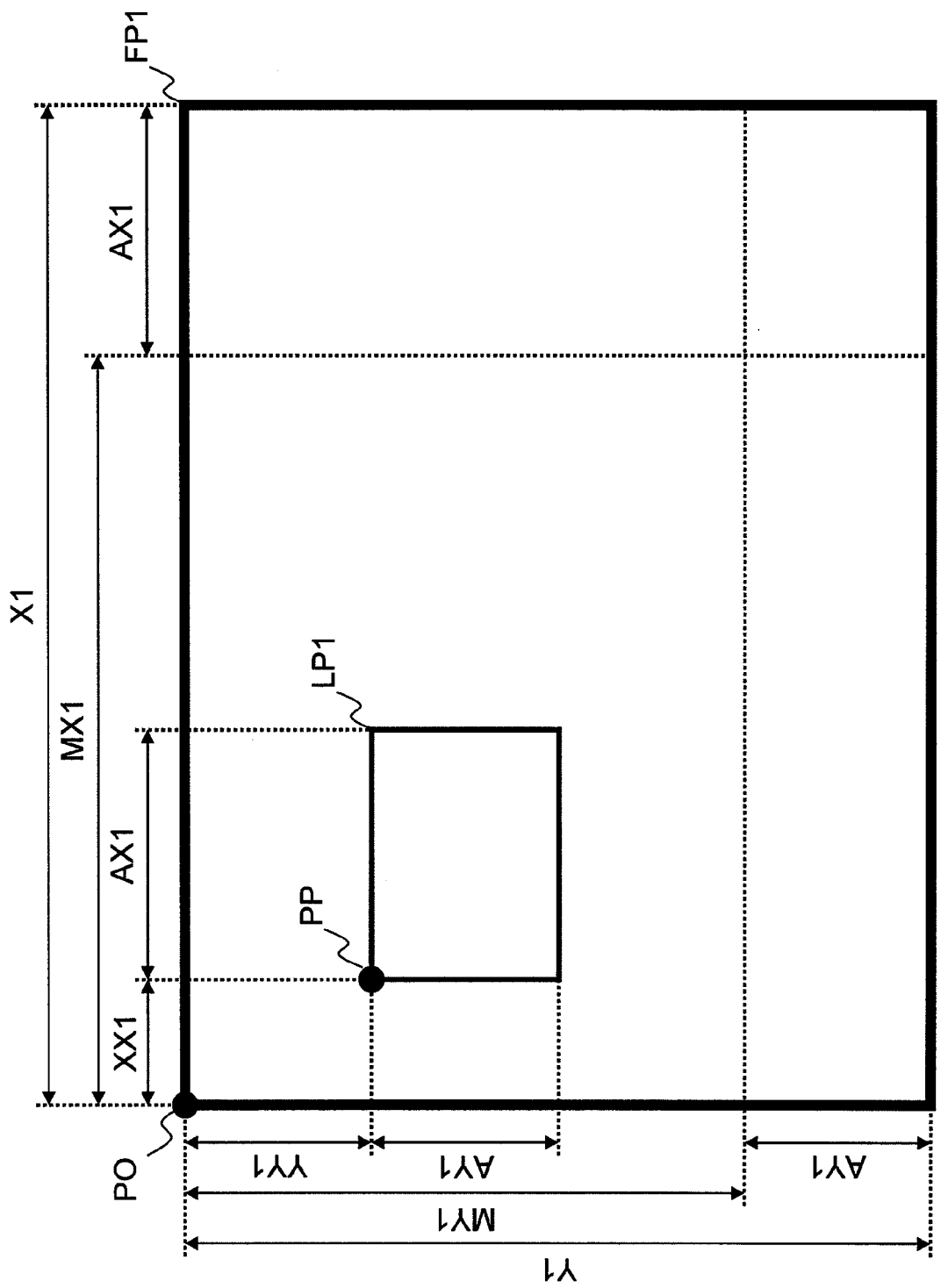
FIG. 2 is a figure that indicates a position relationship between the first image and the first enlargement indication area.

FIG. 2 indicates a position relationship between the first image FP1, which forms an oblong rectangle shape, and the first enlargement indication area LP1 that corresponds to the enlargement indication frame.

Figure 3:
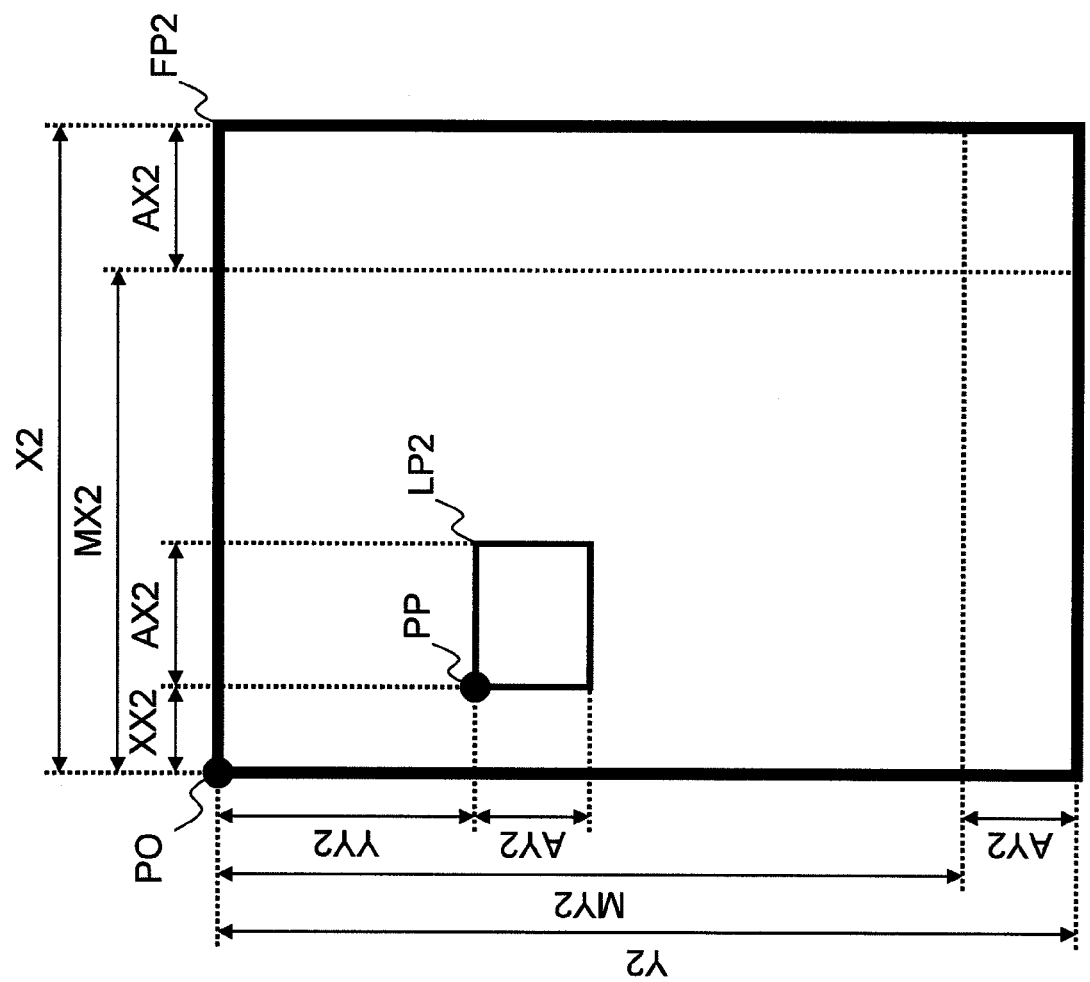
FIG. 3 is a figure that indicates a position relationship between the second image and the second enlargement indication area.

FIG. 3 indicates a position relationship between the second image FP2, which forms a lengthwise rectangle shape, and the second enlargement indication area LP2 that corresponds to the enlargement indication frame.

When the first image FP1 is indicated on the display unit 90, either a total indication or display can be performed, in which all of the first image FP1 is indicated or displayed or an enlargement indication or display can be performed, in which only a part of the first image FP1, the first enlargement indication area LP1, is indicated or displayed in an enlarged state.

Similarly, when the second image FP2 is indicated on the display unit 90, a total indication in which all of the second image FP2 is indicated and an enlargement indication in which only a part of the second image FP2, the second enlargement indication area LP2, is indicated with enlarged state, can be performed.

When the total indication is performed, the controller 30 indicates the entire image (FP1 or FP2) on the display unit 90, under the condition where the aspect ratio of the image is held constant, so that at least one of either a vertical length or horizontal length of the image agrees with a vertical length or horizontal length of the indication area of the display unit 90, respectively; where the vertical length of the image is shorter than or equal to the vertical length of the indication area, and the horizontal length of the image is shorter than or equal to the horizontal length of the indication area.

In the case where the aspect ratio of the image agrees with the aspect ratio of the indication area of the display unit 90, in other words, the image and the indication area are both oblong rectangle shapes and the aspect ratio of the image agrees with that of the indication area, the image is displayed on the indication area of the display unit 90 under the condition that the image agrees with the indication display area.

In the case where the aspect ratio of the image does not agrees with the aspect ratio of the indication area of the display unit 90, in other words, the image is a lengthwise rectangle shape and the indication area is an oblong rectangle shape, the image is indicated in the indication area of the display unit 90 under the condition where the vertical length of the image agrees with the vertical length of the indication area and the horizontal length of the image is shorter than the horizontal length of the indication area.

When the enlargement indication of the first image FP1 is indicated on the display unit 90 after the total indication is performed, the controller 30 indicates the first enlargement indication area LP1 of the first image FP1 in the indication area of the display unit 90 under the condition where the first enlargement indication area LP1 is enlarged within the indication area of the display unit 90 to correspond to the enlargement indication frame that is set by the user through the manipulation of the enlargement and reduction key 11 and the direction keys 12.

Similarly, when the enlargement indication of the second image FP2 is indicated on the display unit 90 after the total indication is performed, the controller 30 indicates the second enlargement indication area LP2 of the second image FP2 in the indication area of the display unit 90 under the condition where the second enlargement indication area LP2 is enlarged within the indication area of the display unit 90 to correspond to the enlargement indication frame that is set by the user through the manipulation of the enlargement and reduction key 11 and the direction keys 12.

When the second image FP2 corresponding to the second image data is indicated after the enlargement indication of the first image FP1 corresponding to the first image data, the controller 30 specifies a position relationship between the first enlargement indication area LP1 (the enlargement indication frame) and the first image FP1, in other words, a position relationship between the base point PP corresponding to the enlargement indication frame and the range of movement of the base point PP in the first image FP1, and controls the display unit 90 under the condition where a part of the second image FP2 is enlarged and indicated in the indication area of the display unit 90 on the basis of the specified position relationship.

The horizontal length of the range of movement of the base point PP in the first image FP1 is specified by the difference between the horizontal length of the first image FP1 and the horizontal length of the first enlargement indication area LP1.

The vertical length of the range of movement of the base point PP in the first image FP1 is specified by the difference between the vertical length of the first image FP1 and the vertical length of the first enlargement Specifically, when the page change key 13 is operated by the user under the condition where the enlargement indication of the first image FP1 is performed, the controller 30 specifies the position relationship between the base point PP and the range of movement of the base point PP in the first image FP, in other words, a ratio of the distance between the base point PP in the first image FP1 and the point of origin PO in the first image FP1 to the range of movement.

The range of movement of the base point PP in the first image FP is an area that has a point that can be specified as the enlargement indication.

The point of origin PO for specifying the base point PP is arranged in the top left corner portion of the first image FP1.

In the embodiment, the base point PP is arranged in the top left corner portion of the enlargement indication frame (the first enlargement indication area LP1 and the second enlargement indication area LP2). However, the base point PP may be arranged in another part of the enlargement indication frame, such as at the center of the enlargement indication frame (the first enlargement indication area LP1 and the second enlargement indication area LP2).

The horizontal length of the first image FP1 is defined as X1, the vertical length of the first image FP1 is defined as Y1, the horizontal length of the first enlargement indication area LP1 is defined as AX1, the vertical length of the first enlargement indication area LP1 is defined as AY1, the horizontal length between the base point PP in the first image FP1 and the point of origin PO in the first image FP1 is defined as XX1, and the vertical length between the base point PP in the first image FP1 and the point of origin PO in the first image FP1 is defined as YY1.

The horizontal length X1 and the vertical length Y1 are specified when the first image data is read.

The horizontal length AX1 and the vertical length AY1 are calculated based on the size of the first image FP1 and an enlargement ratio of the enlargement indication that is set in advance.

The aspect ratio of the first enlargement indication area LP1 is set to agree with the aspect ratio of the indication area of the display unit 90.

The horizontal length X1 and the vertical length Y1 of the first image FP1 are stored in a header of the first image data. In the header of the first image data, information regarding the direction of the image that is detected by a length and width sensor is stored.

The horizontal range of movement of the base point PP in the first image FP1 is defined as MX1, and is equal to the difference between the horizontal length X1 of the first image FP1 and the horizontal length AX1 of the first enlargement indication area LP1 (MX1=X1−AX1).

The vertical range of movement of the base point PP in the first image FP1 is defined as MY1, and is equal to the difference between the vertical length Y1 of the first image FP1 and the vertical length AY1 of the first enlargement indication area LP1 (MY1=Y1−AY1).

Accordingly, the ratio of the distance between the base point PP and the point of origin PO to the range of movement of the base point PP in the horizontal direction is indicated as a first ratio R1(=XX1÷(X1−AX1)), and that in the vertical direction is indicated as a second ratio R2(=YY1÷(Y1−AY1)). The controller 30 temporarily stores the first ratio R1 and the second ratio R2 in a memory in the controller 30.

On the basis of the position relationship between the base point PP and the range of movement of the base point PP in the first image FP1, in other words, based on the ratio of the distance between the base point PP and the point of origin PO to the range of movement of the base point PP, the controller 30 reads the second image data corresponding to the second image FP2 that is the next image of the first image FP1 from the memory unit 70, and performs the enlargement indication of a part of the second image FP2 in the indication area of the display unit 90.

When the enlargement indication of the part of the second image FP2 is performed, the controller 30 specifies the second enlargement indication area LP2 based on the first ratio R1 and the second ratio R2 and performs the enlargement indication of the second enlargement indication area LP2 in the indication area of the display unit 90.

Specifically, by specifying the second enlargement indication area LP2, the base point PP in the second image FP2 is specified.

The base point PP in the second image FP2 is arranged at the position that is a first distance away from the point of origin PO in the second image FP2, in the horizontal direction, and that is a second distance away from the point of origin PO in the second image FP2, in the vertical direction.

The first distance is a product of the horizontal range of movement of the base point PP in the second image FP2 and the first ratio R1.

The second distance is a product of the vertical range of movement of the base point PP in the second image FP2 and the second ratio R2.

The second enlargement indication area LP2 has a horizontal length AX2 and a vertical length AY2, from the base point PP in the second image FP2.

The horizontal length of the second image FP2 is defined as X2, the vertical length of the second image FP2 is defined as Y2, the horizontal length of the second enlargement indication area LP2 is defined as AX2, the vertical length of the second enlargement indication area LP2 is defined as AY2, the horizontal length between the base point PP in the second image FP2 and the point of origin PO in the second image FP2 is defined as XX2, and the vertical length between the base point PP in the second image FP2 and the point of origin PO in the second image FP2 is defined as YY2.

The horizontal length X2 and the vertical length Y2 are specified when the second image data is read.

The horizontal length AX2 and the vertical length AY2 are calculated based on the size of the second image FP2 and an enlargement ratio of the enlargement indication that is set in advance.

The aspect ratio of the second enlargement indication area LP2 is set to agree with the aspect ratio of the indication area of the display unit 90.

In the embodiment, the enlargement ratio of the enlargement indication in the first image FP1 and the enlargement ratio of the enlargement indication in the second image FP2 are the same. However, they may not be the same.

The horizontal length X2 and the vertical length Y2 of the second image FP2 are stored in a header of the second image data. In the header of the second image data, information regarding the direction of the image that is detected by a length and width sensor is stored.

The horizontal length (position) XX2 that is the distance between the base point PP in the second image FP2 and the point of origin PO in the second image FP2, is the product of the horizontal range of movement of the base point PP in the second image FP2 and the first ratio R1, and is indicated by the formula: $XX2=(X2-AX2) \times R1=(X2-AX2) \times XX1 \div (X1-AX1)$.

The vertical length (position) YY2 that is the distance between the base point PP in the second image FP2 and the point of origin PO in the second image FP2, is the product of the vertical range of movement of the base point PP in the second image FP2 and the second ratio R2, and is indicated by the formula: $YY2=(Y2-AY2) \times R2=(Y2-AY2) \times YY1 \div (Y1-AY1)$.

Therefore, when the enlargement indication of the second image FP2 is performed continuously after the enlargement indication of the first image FP1 is performed, the second enlargement indication area LP2, which is in almost the same position as the first enlargement indication area LP1, can be set and indicated even if the aspect ratio of the first image FP1 is different from the aspect ratio of the second image FP2.

Further, if the second image FP2 also forms the oblong rectangle shape and the aspect ratio of the first image FP1 is the same as the aspect ratio of the second image FP2 (X1:X2=Y1:Y2, AX1=AX2, AY1=AY2), the second enlargement indication area LP2, which is in the same position as the first enlargement indication area LP1, can be set and indicated.

Accordingly, in the case where the photographing subject of the first image FP1 is the same as the photographing subject of the second image FP2, but the aspect ratio of the first image FP1 is different from the aspect ratio of the second image FP2 or the size of the first image FP1 is different from the size of the second image FP2 etc., the enlargement indication of almost the same position of the photographing subject can be performed without moving the enlargement indication frame and without re-setting the base point PP.

Particularly, when the enlargement indication of the second image FP2 is performed continuously after the enlargement indication of one of the four corners of the first image FP1 (the first enlargement indication area LP1) is performed, the enlargement indication of one of the four corners of the second image FP2 (the second enlargement indication area LP2) which is in the same position as the first enlargement indication area LP1, can be performed.

Figure 4:
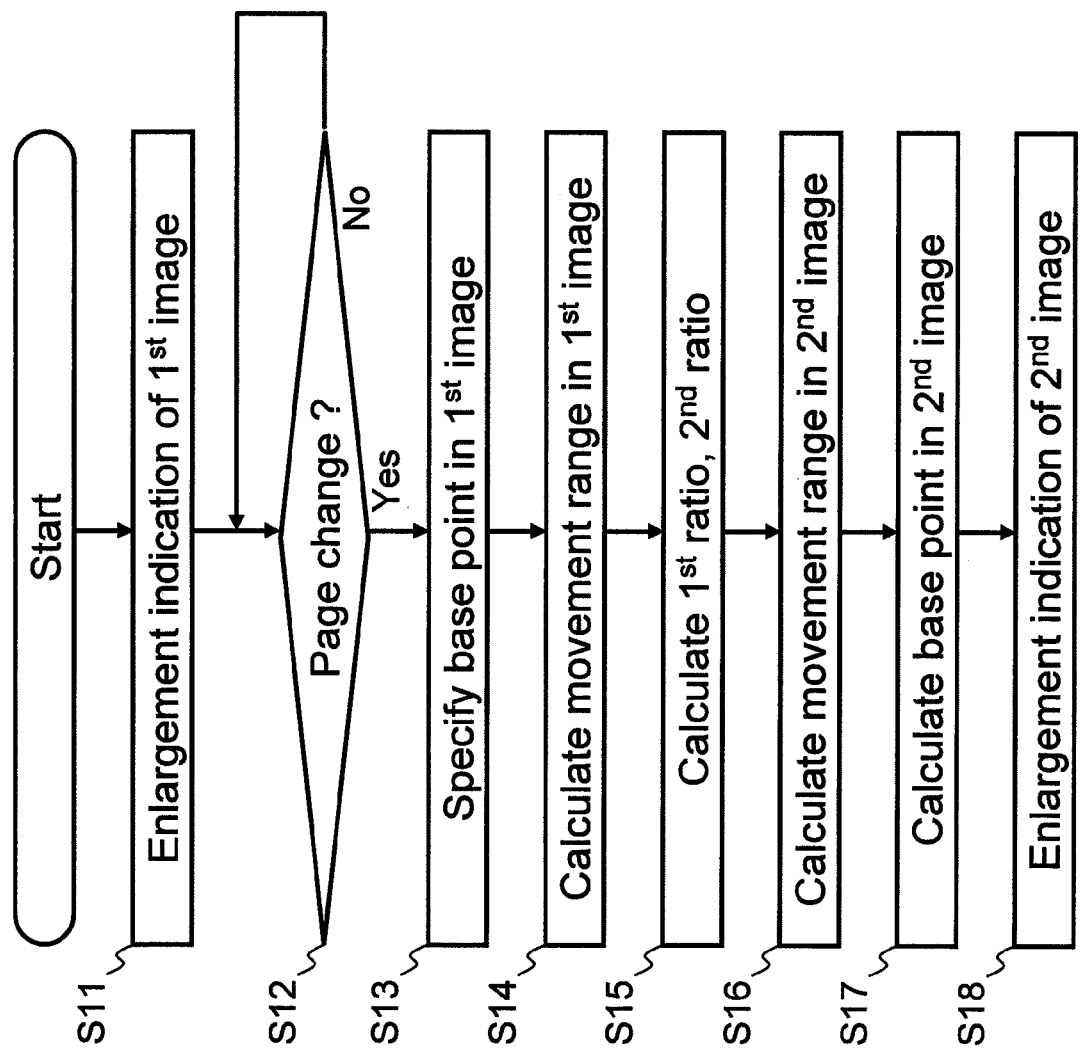
FIG. 4 is a flowchart that indicates a flow of the enlargement indication process in the embodiment.

Next, the flow of the enlargement indication in the embodiment is explained by using the flowchart in FIG. 4. When the operation for performing the enlargement indication, such as the operation of the enlargement and reduction key 11 and the direction keys 12, is performed under the condition where the first image FP1 is indicated on the display unit 90 as the total indication, the enlargement indication of a part of the first image FP1 (the enlargement indication frame including the base point PP (the first enlargement indication area LP1)) is performed in step S11.

In step S12, it is determined whether the page change key 13 is operated; in other words, the operation for indicating the new or previous image (the second image FP2) is performed. When it is determined that the page change key 13 is operated, the operation continues to step S13. Otherwise, the operation in step S12 is repeated.

In step S13, the position of the base point PP in the first image FP1 is specified. Or, the horizontal length XX1 between the base point PP in the first image FP1 and the point of origin PO in the first image FP1, and the vertical length YY1 between the base point PP in the first image FP1 and the point of origin PO in the first image FP1 are specified.

In step S14, the range of movement of the base point PP in the first image FP1 is calculated on the basis of the horizontal length X1 of the first image FP1, the vertical length Y1 of the first image FP1, the horizontal length AX1 of the first enlargement indication area LP1, and the vertical length AY1 of the first enlargement indication area LP1.

The horizontal range of movement MX1 of the base point PP in the first image FP1 is indicated by the formula: $MX1=X1-AX1$. The vertical range of movement MY1 of the base point PP in the first image FP1 is indicated by the formula: $MY1=Y1-AY1$.

In step S15, the position relationship between the base point PP and the range of movement of the base point PP in the first image FP1 (the ratio of the distance between the base point PP in the first image FP1 and the point of origin PO in the first image FP1 to the range of movement) is calculated so that the first ratio R1 and the second ratio R2 are calculated.

In step S16, the range of movement of the base point PP in the second image FP2 is calculated on the basis of the horizontal length X2 of the second image FP2, the vertical length Y2 of the second image FP2, the horizontal length AX2 of the second enlargement indication area LP2, and the vertical length AY2 of the second enlargement indication area LP2.

The horizontal range of movement MX2 of the base point PP in the second image FP2 is indicated by the formula: MX2=X2−AX2. The vertical range of movement MY2 of the base point PP in the second image FP2 is indicated by the formula: MY2=Y2−AY2.

In step S17, a coordinate of the base point PP in the second image FP2 is calculated on the basis of the first ratio R1, the second ratio R2, and the range of movement of the base point PP in the second image FP2. Or, the horizontal length XX2 between the base point PP in the second image FP2 and the point of origin PO in the second image FP2, and the vertical length YY2 between the base point PP in the second image FP2 and the point of origin PO in the second image FP2 are calculated.

In step S18, the enlargement indication of the part of the second image FP2 that is the second enlargement indication area LP2 is performed on the basis of the coordinate of the base point PP in the second image FP2, the horizontal length AX2 of the second enlargement indication area LP2, and the vertical length AY2 of the second enlargement indication area LP2.

In the embodiment, the second image FP2 that forms the lengthwise rectangle shape is indicated after the indication of the first image FP1 that forms the oblong rectangle shape. However, the order of the indication may be reversed so that the first image FP1 may be indicated after the indication of the second image FP2.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2006-247817 (filed on Sep. 13, 2006), which is expressly incorporated herein by reference, in its entirety.

The invention claimed is:

1. A display apparatus comprising:
   a display unit that displays a first image and a second image; and
   a controller that controls said display unit;
   said second image is displayed after an enlargement of a portion of said first image as a first enlargement section, and said controller specifies a first positional relationship between said first enlargement section and said first image, and enlarges said second image on the basis of said first positional relationship;
   said controller specifies said first positional relationship by obtaining a second positional relationship between a base point of said first enlargement section in said first image and a range of movement of said base point of said first enlargement section in said first image, specifies a base point of the second image, specifies a base point of a second enlargement section, that is a section of said second image, and specifies a range of movement of the base point of the second enlargement section in the second image, where said enlargement of said second image is performed on the basis of said second positional relationship, and specifies said second enlargement section on the basis of said base point of said second enlargement section,
   wherein the controller determines a ratio of a distance between the base point of the first enlargement section and a base point of the first image to a range of movement of the base point of the first enlargement section, and specifies the base point of the second enlargement section with respect to the base point of the second image, based on the determined ratio.

2. The display apparatus according to claim 1, wherein a horizontal length of said range of movement of said base point in said first image is specified by a difference between a horizontal length of said first image and a horizontal length of said first enlargement section, and a vertical length of said range of movement of said base point in said first image is specified by a difference between a vertical length of said first image and a vertical length of said first enlargement section.

3. The display apparatus according to claim 1, wherein an aspect ratio of said first enlargement section, an aspect ratio of a second enlargement section and an aspect ratio of a display area of said display unit are the same.

4. A method of enlarging images, comprising:
   enlarging, by a controller, a part of a first image that is a first enlargement section;
   specifying, by the controller, a specified positional relationship between said first enlargement section and said first image by obtaining a base point of the first enlargement section in said first image, and a range of movement of the base point of the first enlargement section in the first image; and
   selecting and enlarging, by the controller, a part of a second image on the basis of said specified positional relationship, specifying, by the controller, a base point of the second image, and specifying a base point of the second enlargement section, that is a section of the second image, and specifying a range of movement of the base point of the second enlargement section in the second image where the enlargement of the second image is performed on a basis of a relationship between the base point of the first enlargement section and the range of movement of the base point in the first image, and specifying the second enlargement section on the basis of the base point of the second enlargement section,
   wherein the controller determines a ratio of a distance between the base point of the first enlargement section and a base point of the first image to a range of movement of the base point of the first enlargement section, and specifies the base point of the second enlargement section with respect to the base point of the second image, based on the determined ratio.

5. The method of enlarging according to claim 4, wherein a horizontal length of a range of movement of a base point in the first image is specified by a difference between a horizontal length of the first image and a horizontal length of the first enlargement section, and a vertical length of the range of movement of the base point in the first image is specified by a difference between a vertical length of the first image and a vertical length of the first enlargement section.

6. The method of enlarging according to claim 4, wherein an aspect ratio of the first enlargement section, an aspect ratio of a second enlargement section, and an aspect ratio of a display area of a display are the same.

7. A display apparatus comprising:
a display unit that displays a first image and a second image; and
a controller that controls said display unit;
said controller being configured to specify a first positional relationship between a first enlargement section, which is an enlargement of a portion of said first image, and said first image, and enlarges said second image, which is enlarged subsequent to enlargement of the portion of said first image, on the basis of said first positional relationship;
said controller further being configured to specify said first positional relationship by obtaining a second positional relationship between a base point of said first enlargement section in said first image and a range of movement of said base point of said first enlargement section in said first image, to specify a base point of the second image, to specify a base point of a second enlargement section, that is a section of said second image, and to specify a range of movement of the base point of the second enlargement section in the second image, said enlargement of said second image being performed on the basis of said second positional relationship, and to specify said second enlargement section on the basis of said base point in said second enlargement section,
wherein the controller determines a ratio of a distance between the base point of the first enlargement section and a base point of the first image to a range of movement of the base point of the first enlargement section, and specifies the base point of the second enlargement section with respect to the base point of the second image, based on the determined ratio.

8. The display apparatus according to claim 7, wherein a horizontal length of said range of movement of said base point in said first image is specified by a difference between a horizontal length of said first image and a horizontal length of said first enlargement section, and a vertical length of said range of movement of said base point in said first image is specified by a difference between a vertical length of said first image and a vertical length of said first enlargement section.

9. The display apparatus according to claim 7, wherein an aspect ratio of said first enlargement section, an aspect ratio of said second enlargement section and an aspect ratio of a display area of said display unit are the same.

* * * * *